(12) United States Patent
Seneviratne et al.

(10) Patent No.: US 12,551,968 B2
(45) Date of Patent: Feb. 17, 2026

(54) SYSTEMS AND METHODS FOR INDUCTION WELDING

(71) Applicant: Wichita State University, Wichita, KS (US)

(72) Inventors: Waruna Seneviratne, Wichita, KS (US); John Tomblin, Wichita, KS (US); Brandon Saathoff, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 1205 days.

(21) Appl. No.: 17/207,647

(22) Filed: Mar. 20, 2021

(65) Prior Publication Data

US 2021/0291292 A1    Sep. 23, 2021

Related U.S. Application Data

(60) Provisional application No. 62/992,241, filed on Mar. 20, 2020.

(51) Int. Cl.
*B23K 13/01* (2006.01)
*B23K 20/02* (2006.01)

(52) U.S. Cl.
CPC ............ *B23K 13/01* (2013.01); *B23K 20/023* (2013.01)

(58) Field of Classification Search
CPC .... B23K 13/01; B23K 20/023; B23K 37/003; B23K 13/02; H05B 6/14
See application file for complete search history.

(56) References Cited

U.S. PATENT DOCUMENTS

| 3,395,261 A * | 7/1968 | Leatherman ........ B29C 65/3612 |
| | | 219/673 |
| 3,941,643 A * | 3/1976 | Balla .................. B29C 65/3644 |
| | | 156/500 |
| 4,978,825 A | 12/1990 | Schmidt et al. |
| (Continued) | | |

FOREIGN PATENT DOCUMENTS

| EP | 2801472 | 11/2016 |
| WO | WO2013110270 | 8/2013 |

OTHER PUBLICATIONS

PCT International Search Report and Written Opinion in International Application No. PCT/US2021/023443, dated Aug. 23, 2021, 10 pages.

*Primary Examiner* — Brian W Jennison
*Assistant Examiner* — Kristina J Babinski
(74) *Attorney, Agent, or Firm* — Stinson LLP

(57) ABSTRACT

An induction welder for inductively welding two or more components has an induction coil for applying a magnetic field to a weld site of the two or more components to inductively weld the two or more components together. The induction coil includes a proximal end and a distal end. The distal end is positioned proximate the weld site of the two or more components to inductively weld the two or more components at the weld site. A press is disposed distally of the induction coil such that the press is disposed between the induction coil and the two or more components when the two or more components are being inductively welded together. The press is used to apply pressure to the two or more components and press the two or more components together at the weld site simultaneously with the application of the magnetic field at the weld site.

23 Claims, 7 Drawing Sheets

(56) References Cited

U.S. PATENT DOCUMENTS

| | | | | |
|---|---|---|---|---|
| 5,793,024 | A * | 8/1998 | Matsen | B29C 65/32 |
| | | | | 219/645 |
| 6,881,374 | B2 * | 4/2005 | Gerhard | B32B 38/1866 |
| | | | | 264/294 |
| 9,527,237 | B2 * | 12/2016 | Benson | B29C 66/1122 |
| 9,944,056 | B2 * | 4/2018 | Codognotto | B32B 38/0008 |
| 2001/0052451 | A1 * | 12/2001 | Ruoss | B65G 17/34 |
| | | | | 198/853 |
| 2019/0118252 | A1 * | 4/2019 | Bauer | B22F 3/1017 |
| 2020/0198258 | A1 * | 6/2020 | Gallo | B29C 65/3696 |
| 2021/0039327 | A1 * | 2/2021 | DiChiara | B29C 66/91411 |

\* cited by examiner

SYSTEMS AND METHODS FOR INDUCTION WELDING

CROSS-REFERENCE TO RELATED APPLICATIONS

This application claims priority to U.S. Provisional Patent Application No. 62/992,241, filed Mar. 20, 2020, and entitled Systems and Methods for Induction Welding, which is hereby incorporated by reference in its entirety.

FIELD OF DISCLOSURE

The present disclosure generally relates to induction welding, and more specifically, to an induction welder for induction welding.

BACKGROUND

Induction welding uses a magnetic or electromagnetic field to inductively heat two or more components, melting and fusing the components together. Induction welding (or thermoplastic welding) is frequently used in the aerospace industry to join thermoplastic components together. Although induction welding can be used to join components made of other materials, such as any electrically conductive or ferromagnetic material. In conventional induction welding, an induction coil is used to heat and melt the two or more components and then, after the components are heated, a press or roller is used to press the two or more components together. As the components cool, the components fuse together, bonding or joining the components.

SUMMARY

In one aspect, an induction welder for inductively welding two or more components comprises an induction coil configured to apply a magnetic field to a weld site of the two or more components to inductively weld the two or more components together. The induction coil includes a proximal end and a distal end. The distal end is configured to be positioned proximate the weld site of the two or more components to inductively weld the two or more components at the weld site. A press is disposed distally of the induction coil such that the press is disposed between the induction coil and the two or more components when the two or more components are being inductively welded together. The press configured to press the two or more components together at the weld site simultaneously with the application of the magnetic field at the weld site.

In another aspect, a method for inductively welding two or more components together comprises applying a magnetic field to a weld site of the two or more components to inductively weld the two or more components together, and simultaneously with applying the magnetic field, pressing the two or more components together at the weld site.

Other aspects will be apparent hereinafter

BRIEF DESCRIPTION OF THE DRAWINGS

Corresponding reference characters indicate corresponding parts throughout the drawings.

DETAILED DESCRIPTION

Figure 1:
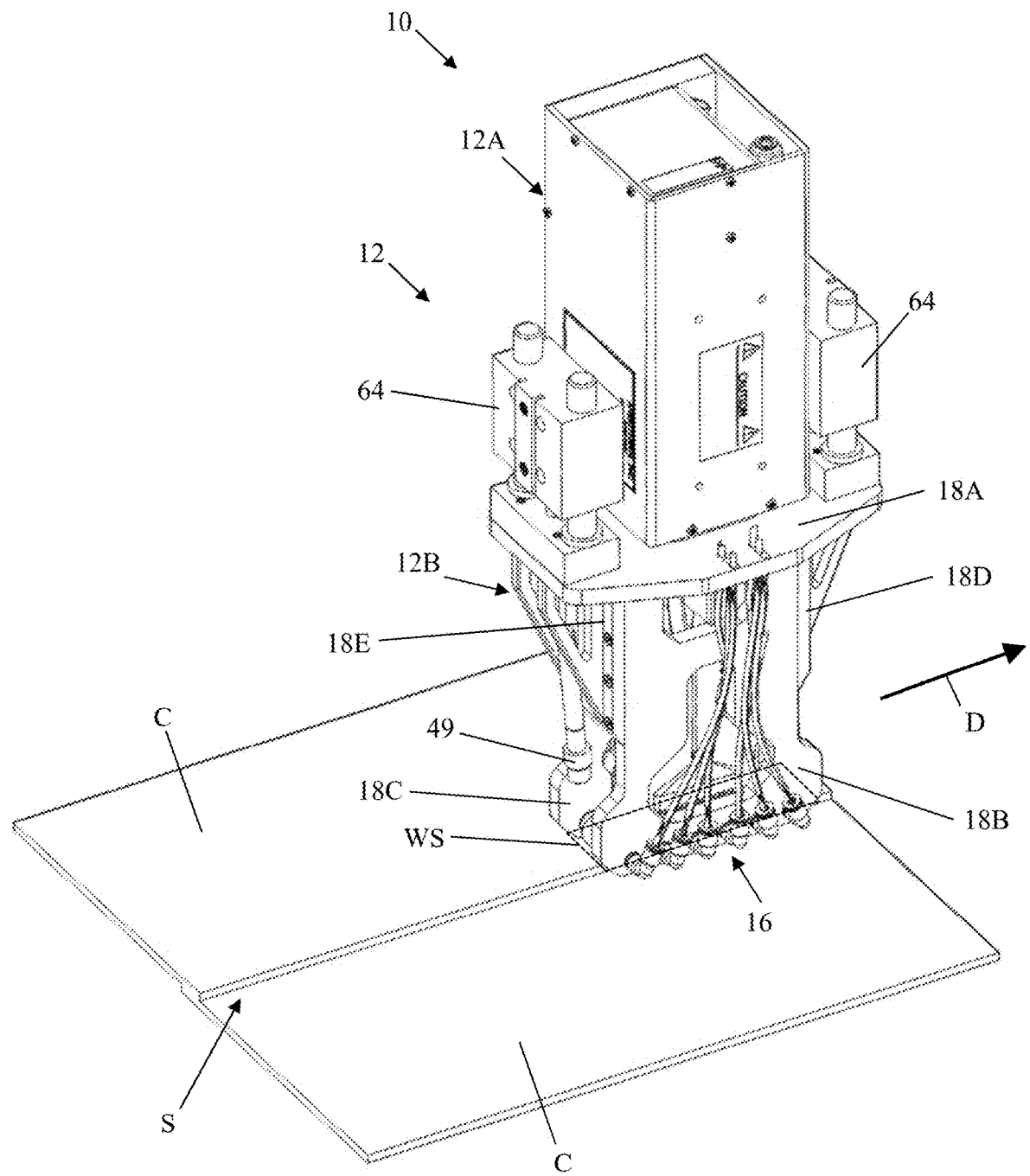
FIG. 1 is a perspective of an induction welder, according to one embodiment of the present disclosure, inductively welding two components together.
Figure 2:
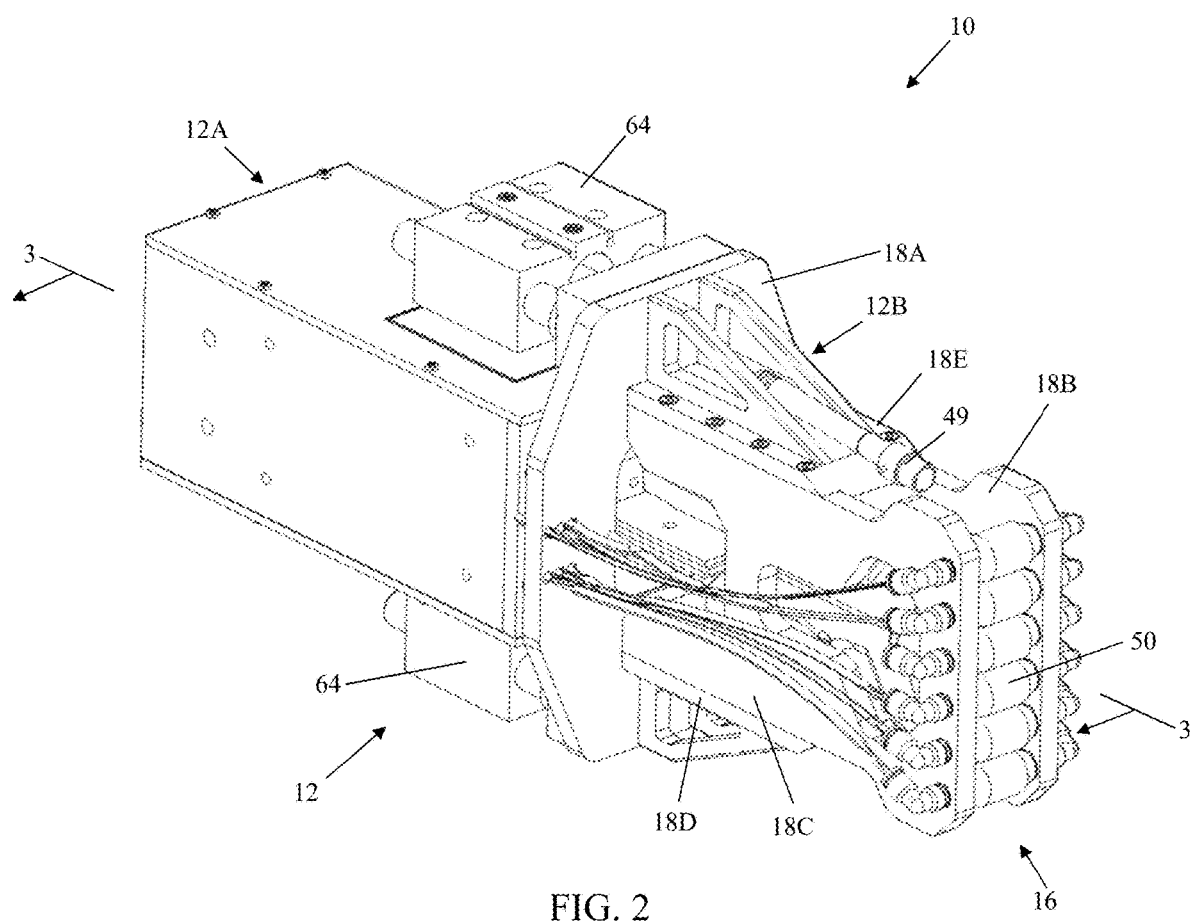
FIG. 2 is a perspective of the induction welder.

Referring to FIGS. 1 and 2, one embodiment of an induction welder (e.g., thermoplastic welder) for inductively welding two or more components C together is generally indicated at reference numeral 10. The induction welder 10 is used in a manufacturing process to join two or more components C together along a weld line or seam S, where the two or more components generally overlap. The induction welder 10 can be used in generally any manufacturing process where the two or more components C need to be joined together. In the illustrated embodiment, the induction welder 10 is configured as an end effector for a robot (not shown). The robot moves the induction welder 10 over the seam S of the two or more components C in a linear or non-linear weld direction D to weld the components together. Other configurations of the induction welder 10 are within the scope of the present disclosure. For example, the induction welder 10 may be hand operated. Further details of the operation of the induction welder 10 are described below.

The induction welder 10 includes a housing 12 having a proximal portion 12A and a distal portion 12B. The distal portion 12B of the housing 12 houses or contains an induction coil, generally indicated at reference numeral 14 (FIG. 3), and a press, generally indicated at reference numeral 16. As explained in more detail below, the induction coil 14 generates or applies a magnetic field to the two or more components C and the press 16 presses or pushes the two or more components together. The distal portion 12B of the housing 12 includes a base plate or wall 18A, opposite first and second side plates or walls 18B and 18C, respectively, extending distally from the base plate to respective free ends and opposite first and second end plates or walls 18D and 18E, respectively, extending distally from the base plate and connected to the first and second side plates. Together, the base plate 18A, side plates 18B, 18C and end plates 18D, 18E define (e.g., bound) an interior 20. The induction coil 14 and the press 16 are generally disposed in the interior 20. The distal portion 12B of the housing 12 is not enclosed and includes multiple openings (e.g., openings in or between plates 18A-18E) to permit air to move freely over and through the distal portion to help facilitate the cooling the components (e.g., induction coil 14, press 16, etc.) housed therein, for reasons that will become apparent. The proximal portion 12A of the housing 12 houses or contains various controls (not shown), such as electrical controls (e.g., a control system or controller), for operating the induction welder 10. The proximal portion 12B may include one or more ports (not shown), such as fluid and/or gas ports, for fluidly coupling the induction welder 10 to a refrigerant or cooling source and/or a positive pressure source for cooling (e.g., actively cooling) one or more components of the induction welder, as described in more detail below. The proximal portion 12A of the housing 12 may also include one or more electrical connectors (not shown) for electrically coupling the induction welder 10 to an electrical source (e.g., electrical utility grid), for reasons that will become apparent.

Figure 3:
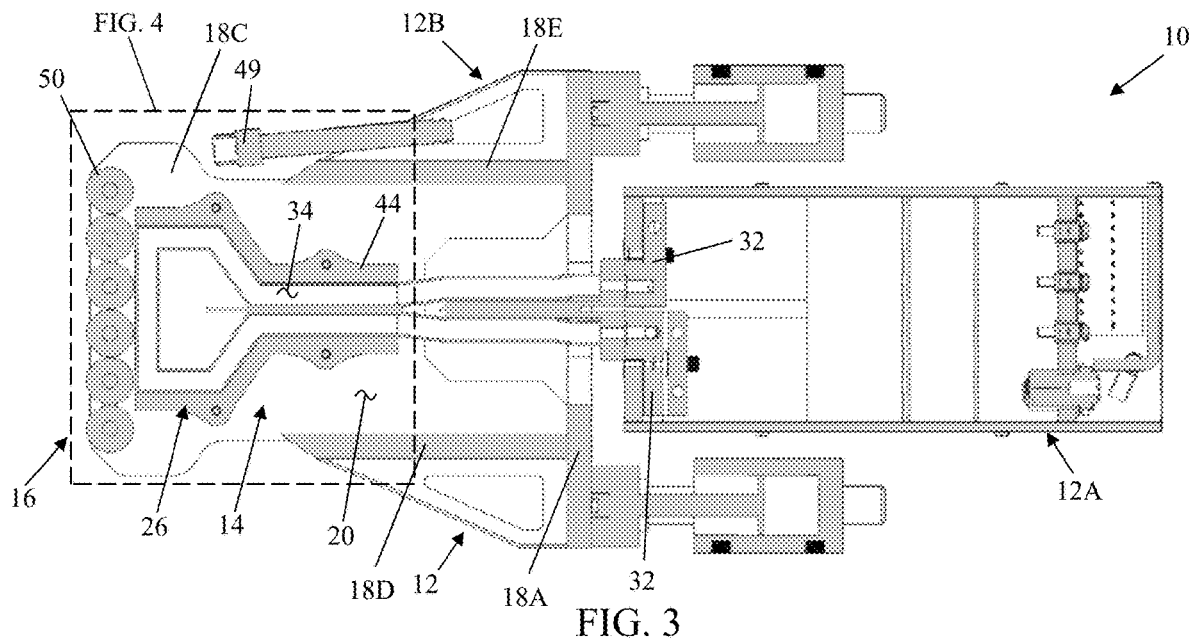
FIG. 3 is a cross section of the induction welder taken through line 3-3 of FIG. 2.
Figure 4:
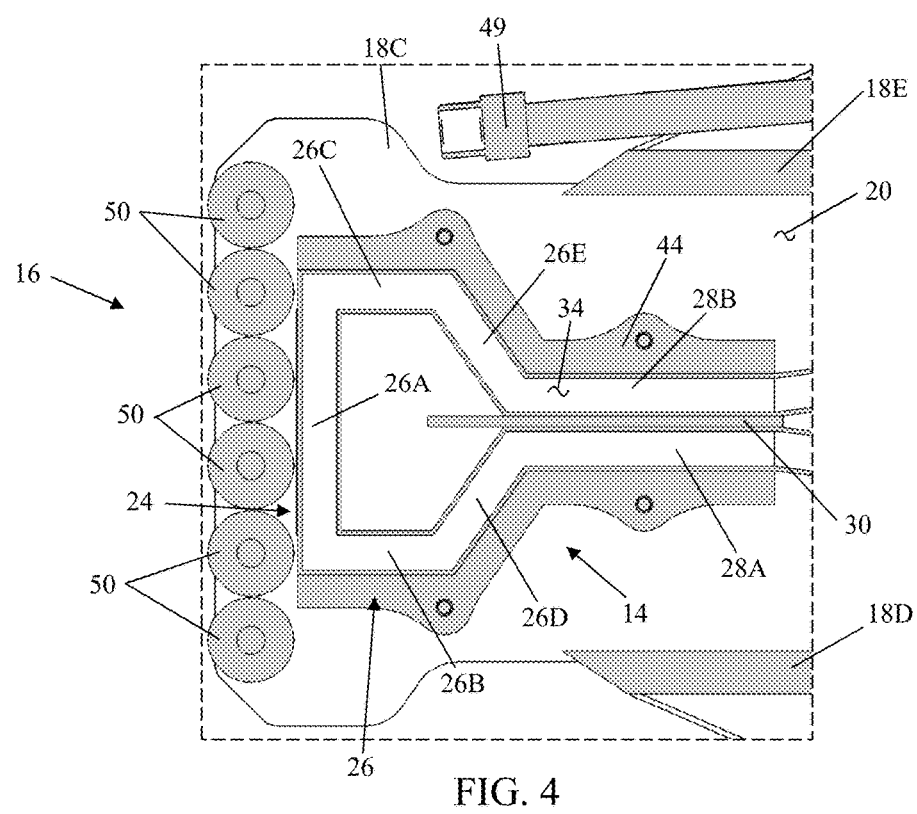
FIG. 4 is an enlarged, fragmentary view of the cross section of FIG. 3.
Figure 5:
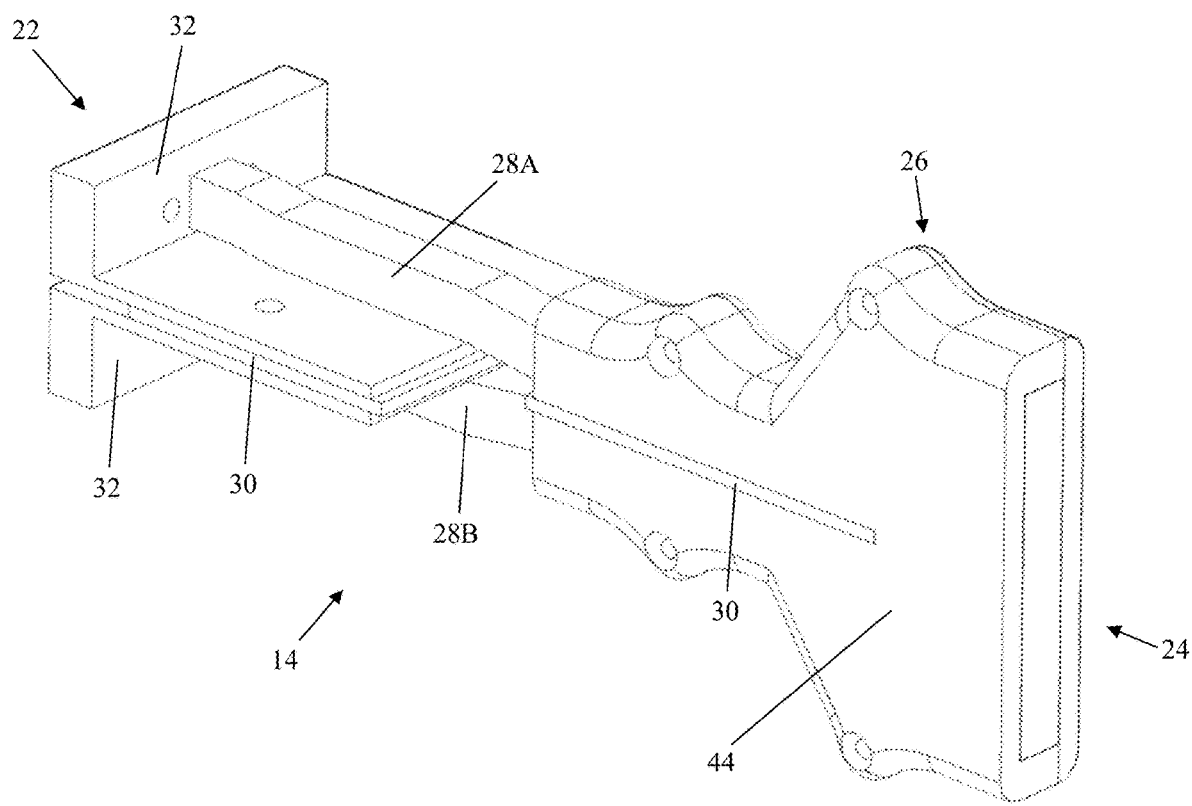
FIG. 5 is perspective of an induction coil of the induction welder.

Referring to FIGS. 3-5, the induction coil 14 is configured to apply a magnetic field to a weld site WS (FIG. 1) of the two or more components C to inductively weld the two or more components together. The induction coil 14 includes a proximal end 22 and a distal or working end 24. The distal end 24 of the induction coil generates the magnetic field used to inductively weld the components C together. The distal end 24 of the induction coil 14 is configured to be positioned proximate to the weld site WS (e.g., seam S) of the two or more components C to inductively weld the two or more components together at the weld site. As shown in FIG. 1, the weld site WS of the two or more components is an area of the two or more components that is distal of the induction coil 14 and generally underlies the distal end 24 of the induction coil. Accordingly, it is understood that as the induction welder 10 moves along the seam S of the two or more components C in the weld direction D, the weld site WS will also move along the seam in the weld direction.

The induction coil 14 includes an induction coil head 26. The induction coil head 26 defines the distal end 24 of the induction coil 14. The induction coil head 26 includes a base coil segment 26A that defines the distal end 24 of the induction coil 14. The induction coil head 26 also includes first and second coil segments 26B and 26C, respectively. The first and second coil segments 26B, 26C extend generally proximally from opposite ends of the base coil segment 26A. The induction coil head 26 also includes third and fourth coil segments 26D and 26E, respectively. The third and fourth coil segments 26D, 26E extend generally proximally and toward one another from the ends of the first and second coil segments 26B, 26C, respectively. Thus, the induction coil head 26 has a generally pentagon shape, and more specifically, a generally house pentagon shape. The induction coil head 26 with this shape provides several advantages, such as creating a uniform temperature profile at the weld site WS and seam S by inducing a strong uniform magnetic field. The coil segments 26A-E of the induction coil head 26 are all generally linear. Other configurations of the induction coil head 26 are within the scope of the present disclosure.

First and second extension coil segments 28A and 28B, respectively, generally extend proximally from the opposite ends of the induction coil head 26 (e.g., respective ends of the third and fourth coil segments 26D, 26E). The first and second extension coil segments 28A, 28B extend toward the proximal end 22 of the induction coil 14 from the induction coil head 26. The first and second extension coil segments 28A, 28B are adjacent to one another and separated by one or more electrical insulation inserts 30. The inserts 30 prevent arcing from occurring between the first and second extension coil segments 28A, 28B. The inserts 30 can be made of generally any type of electrically insulating material, such as Teflon. Mounting brackets 32 are secured to the proximal ends of the first and second extension coil segments 28A, 28B. The mounting brackets 32 are used to mount the induction coil 14 to the proximal housing 12A and electrically couple the induction coil to corresponding electrical conductors, connectors or contacts (not shown). The mounting brackets 32 generally define the proximal end of the induction coil 14.

Still referring to FIGS. 3-5, the induction welder 10 includes a magnetic flux controller 44 surrounding at least a portion of the induction coil 14. The magnetic flux controller 44 functions to shield components (e.g., distal housing portion 12B, etc.) of the induction welder 10 from being subjected to the magnetic field generated by the induction coil 14, thereby preventing these components from heating up. The magnetic flux controller 44 also functions to direct the magnetic field generated by the induction coil 14 distally, toward the two or more components C. In the illustrated embodiment, the magnetic flux controller 44 extends proximally, along the induction coil 14, from the distal end 24 (broadly, from generally adjacent the distal end) of the induction coil. The magnetic flux controller 44 generally surrounds or envelopes portions of the induction coil head 26 but leaves the distal end 24 of the induction coil 14 exposed (e.g. does not extend distally of the induction coil). As a result of the uncovered distal end 24, the magnetic flux controller 44 directs the generated magnetic field distally, toward the components C. The magnetic flux controller 44 generally surrounds the coil segments 26A-E and distal portions of the first and second extension coil segments 28A, 28B. In the illustrated embodiment, the magnetic flux controller 44 is mounted on the induction coil 14. The magnetic flux controller 44 may comprise two or more pieces secured together, such as by fasteners. Other configurations of the magnetic flux controller 44 are within the scope of the present disclosure.

In the illustrated embodiment, the induction coil 14 defines (e.g., includes) a conduit 34 (e.g., a coil refrigerant conduit). The conduit 34 extends along the length of the induction coil 14. As explained in more detail below, a refrigerant flows through the conduit 34 to cool the induction coil 14 when the induction coil is generating the magnetic field and welding the two or more components C together. Preferably, the induction coil 14 has a rectangular cross-sectional shape. In the illustrated embodiment, the induction coil 14 comprises (e.g., is made from) rectangular tubing, or more specifically, square tubing. The rectangular tubing of the induction coil 14 is hollow to form (e.g., define) the conduit 34. In one embodiment, the induction coil is made from copper tubing, although other suitable materials (e.g., metals) are within the scope of the present disclosure. Other arrangements and configurations of the induction coil 14 are within the scope of the present disclosure. The rectangular tubing of the induction coil 14 creates a stronger and more uniform magnetic field. In addition, the magnetic flux controller 44 also facilitates the formation of the more uniform magnetic field due to its uniform contact with the sides of the rectangular tubing of the induction coil 14.

Figure 6:
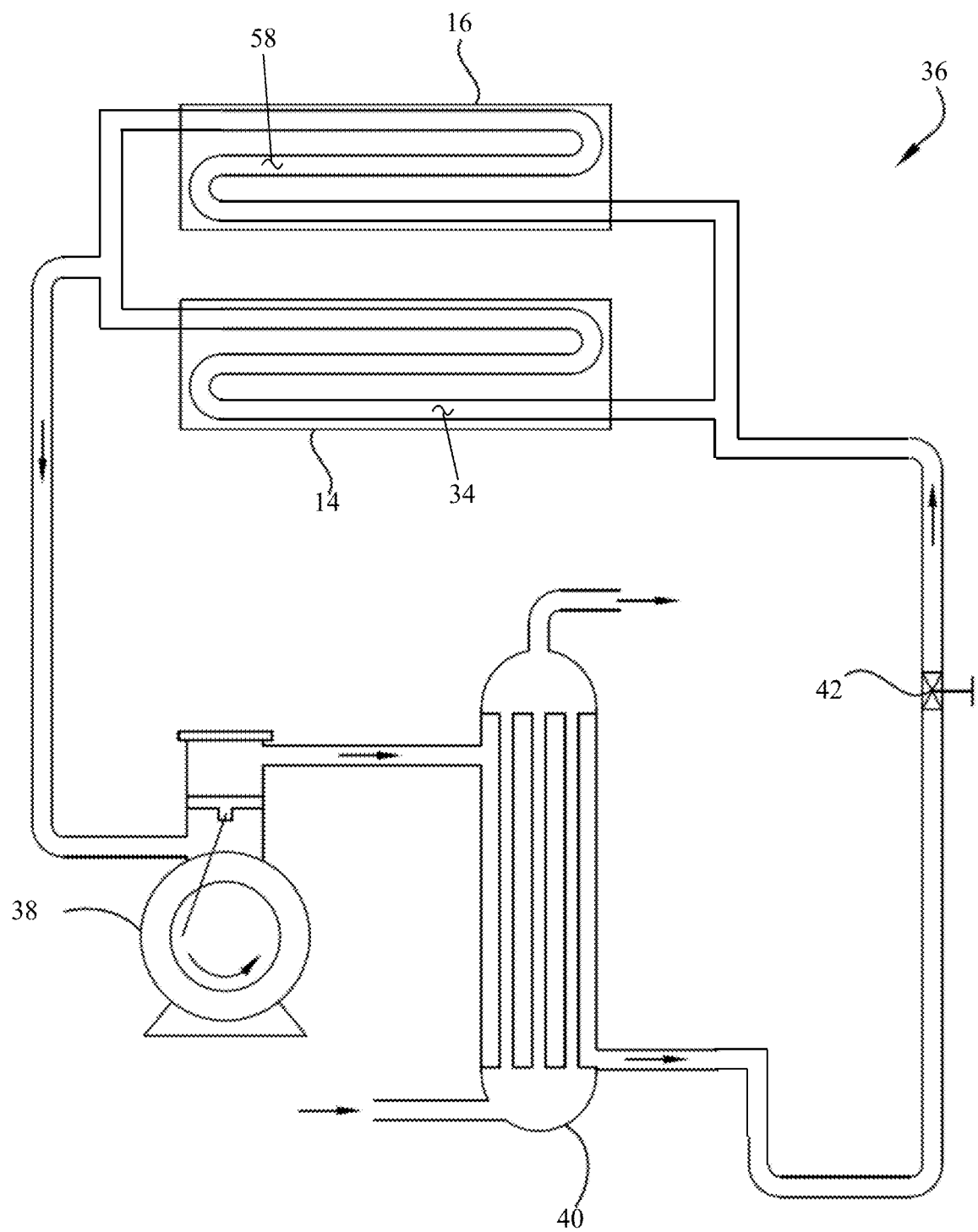
FIG. 6 is a schematic of a welder cooling system of the induction welder.

Referring to FIG. 6, a cooling or refrigeration system 36 (e.g., a welder cooling system) for the induction welder 10 is schematically shown. As will become apparent the welder cooling system 36 is configured to cool one or more components of the induction welder 10. In the illustrated embodiment, the welder cooling system 36 is configured to cool the induction coil 14 and the press 16 (broadly, at least one of the induction coil or the press). The welder cooling system 36 may be used to cool other components of the induction welder 10. The welder cooling system 36 supplies the refrigerant to the induction coil 14 and the press 16 to cool the induction coil and press. Specifically, the welder cooling system 36 flows refrigerant through the conduit 34 of the induction coil 14 to cool the induction coil, while the induction coil is generating the magnetic field. The welder cooling system 36 includes a compressor 38, a condenser 40 and an expansion valve 42, all fluidly coupled to the induction coil 14 and the press 16 (which function as evaporators, as understood by one having ordinary skill in the art). The compressor 38, the condenser 40 and the expansion valve 42 may be spaced apart from the induction welder 10 and fluidly coupled to the induction welder with one or more fluid conduits. In one embodiment, the refrigerant is a water-glycol mixture, although the use of other types of refrigerants is within the scope of the present disclosure. Welder cooling systems 36 having other configurations may be used without departing from the scope of the present disclosure. In the illustrated embodiment, the mounting brackets 32 include fluid ports (not shown) to fluidly couple the conduit 34 of the induction coil 14 to the welder cooling system 36.

Figure 7:
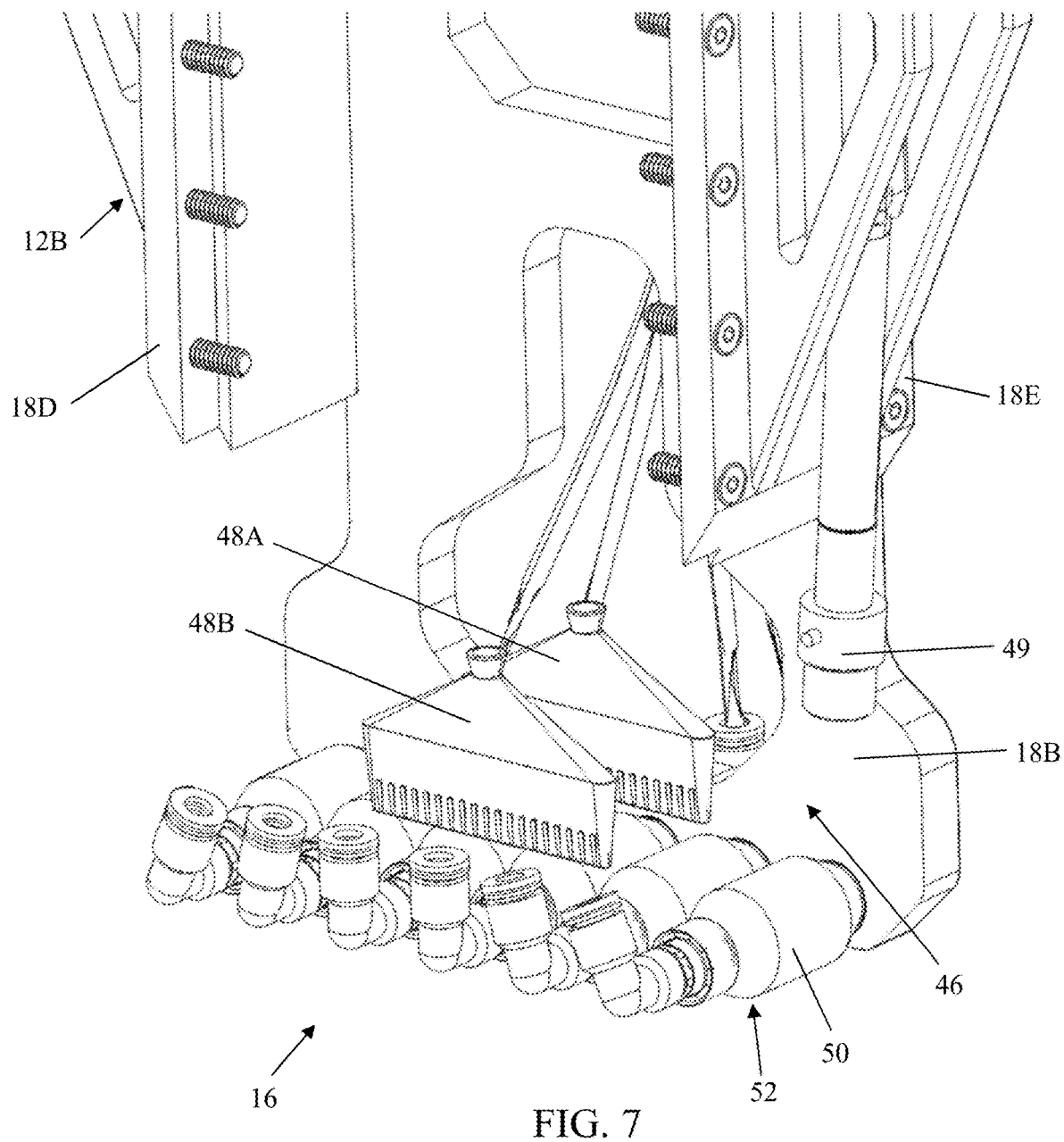
FIG. 7 is a perspective of a working end of the induction welder, with portions of the induction welder hidden from view to show interior details.

Referring to FIG. 7, the induction welder 10 may include a component cooling system 46 (e.g., gas or air cooling system) to cool the two or more components C. The illustrated component cooling system 46 directs gas (e.g., air) over the two or more components C to cool the components. The component cooling system 46 cools the two or more components C simultaneously with the application of the magnetic field by the induction coil 14. The component cooling system 46 includes at least one nozzle 48 (e.g., air nozzle) configured to direct the gas distally, toward and over the two or more components C. In the illustrated embodiment, the component cooling system 46 includes two (e.g., first and second) nozzles 48A-B, although more or fewer nozzles are within the scope of the present disclosure. The nozzles 48A-B are fluidly coupled to a positive pressure source (not shown), such as an air compressor, a blower, a fan, etc., with one or more conduits (not shown). The positive pressure source supplies the gas to the nozzles 48A-B, with the nozzles directing the gas over the two or more components C to cool the components. The first and second nozzles 48A, 48B are disposed on opposite sides of the induction coil 14 (e.g., induction coil head 26). In the illustrated embodiment, the first and second nozzles 48A, 48B are flat air nozzles configured to generate a generally flat and wide stream of gas toward the two or more components C. Preferably, the width of the stream of gas is about the same as the width of the distal end 24 of the induction coil 14. The first and second nozzles 48A, 48B generally direct gas on either side of the seam S to cool the area of the components C adjacent the weld site WS and limit the heating of the components C at the weld site. In the illustrated embodiment, the gas from the first and second nozzles 48A, 48B passes through the press 16 before coming into contact with the two or more components C. As a result, the gas from the first and second nozzles 48A, 48B may also cool the press 16.

Referring to FIGS. 1-4 and 7, the induction welder 10 may include a temperature sensor 49 for measuring the temperature (e.g., surface temperature) of the two or more components C (e.g., seam S). In the illustrated embodiment, the temperature sensor 49 is adjacent the second end plate 18E and senses the temperature of the two or more components C at the seam S after the two or more components have been welded together. In other words, the temperature sensor 49 senses the temperature of a portion of the two or more components C after the induction coil 14 has passed over said portion of the two or more components. One example of a suitable temperature sensor 49 is a pyrometer, although other types of temperature sensors are within the scope of the present disclosure. The temperature sensor 49 is coupled to the controls of the induction welder 10 and/or robot. Based on information from the temperature sensor 49, the speed the induction welder 10 moves over the two or more components C and/or the power supplied to the induction coil 14 can be adjusted (e.g., the more power supplied to the induction coil 14, the stronger the generated magnetic field). Using the information from the temperature sensor 49, the controls of the induction welder 10 and/or robot may conduct a closed loop control routine to adjust (e.g., increase, decrease, maintain) the speed of the induction welder and/or amount of power to the induction coil 14 as the induction welder is moved along the seam S of the two or more components C to ensure a relatively uniform temperature which generally corresponds to a relative uniform weld.

Referring to FIGS. 1-4 and 7-9, the press 16 is configured to press or push the two or more components C together at the weld site WS simultaneously with the application of the magnetic field at the weld site by the induction coil 14. The press 16 is disposed distally of the induction coil 14 such that the press is disposed between the induction coil and the two or more components C when the components are being inductively welded together. In the illustrated embodiment, the press 16 is a roller press with a plurality of rollers 50 (broadly, at least one roller) configured to roll over the seam S of two or more components C, thereby pushing the two or more components together. In the illustrated embodiment, the press 16 includes six rollers 50, although more or fewer rollers are within the scope of the present disclosure. All of the rollers 50 generally lie generally within the same plane, which is generally parallel to the weld direction D. When the press 16 is engaged with the two or more components C, generally all of the rollers 50 contact the components C (specifically, the seam S). Other configurations of the press 16 are within the scope of the present disclosure. Alternative roller configurations are contemplated within the scope of this disclosure. For example, in one embodiment, the press includes one roller in front of the coil (with respect to the weld direction D) and another roller behind the coil and a plate or sled between the rollers immediately distal of the coil.

Figure 8:
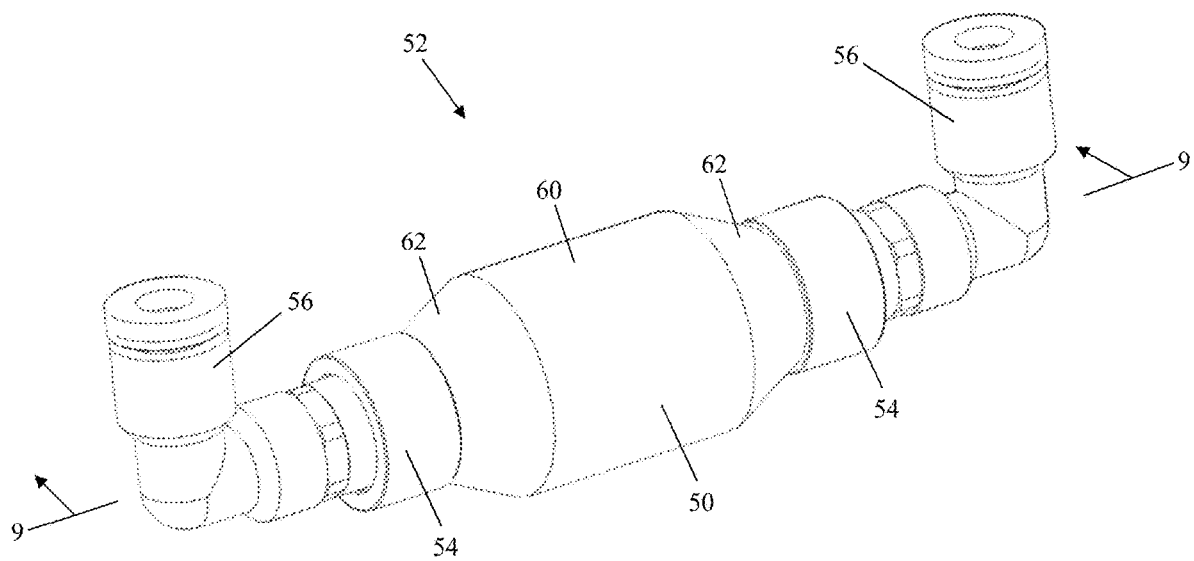
FIG. 8 is a perspective of a roller assembly of the induction welder.
Figure 9:
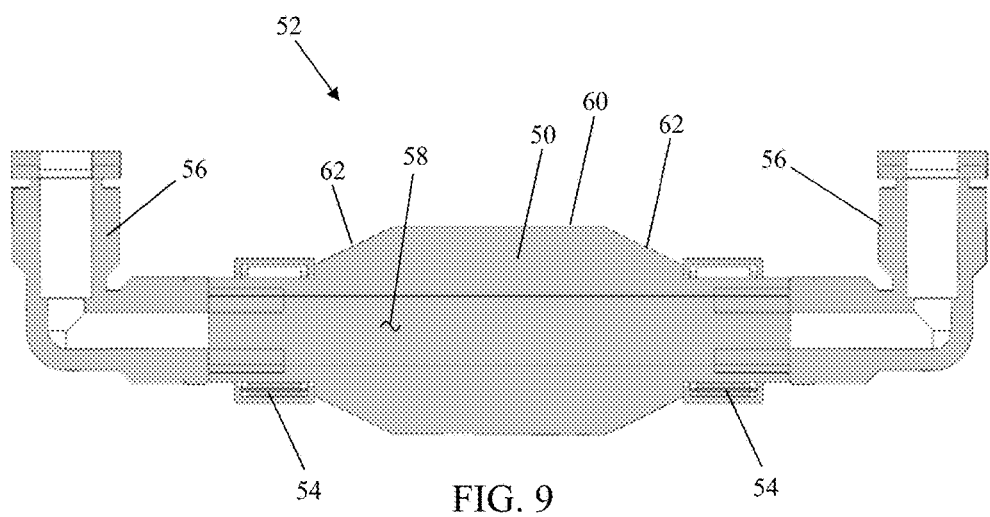
FIG. 9 is a cross section of the roller assembly taken through line 9-9 of FIG. 7.

Referring to FIGS. 7-9, each of the illustrated rollers 50 is part of a roller assembly 52. The roller assembly 52 includes the roller 50, first and second bearings 54 and first and second fittings 56. The first and second bearings 54 are coupled to the opposite ends of the roller 50. The first and second bearings 54 are connected to the distal housing portion 12B (specifically, the first and second side plates 18B, 18C). The bearings 54 support the roller 50 and allow the roller to rotate freely when the roller is in contact with the two or more components C and the induction welder 10 moves in the weld direction D. As mentioned above, the press 16 can be cooled by the welder cooling system 36. More specifically, the welder cooling system 36 is configured to cool the rollers 50. By cooling the rollers 50, the surface of the components C can be cooled. The welder cooling system 36 is fluidly coupled to the roller 50 and is configured to bring the refrigerant into contact with the roller to cool the roller. In particular, as shown in FIG. 9, each roller 50 defines (e.g., has) a refrigerant conduit or cavity 58 which permits refrigerant to flow through the roller (e.g., roller assembly 52). To cool the roller 50, the welder cooling system 36 flows the refrigerant through the refrigerant conduit 58. The refrigerant conduit 58 extends from one end of the roller 50 to the other end. The first and second fittings 56 are coupled to the respective ends of roller 50. The first and second fitting 56 fluidly couple the refrigeration conduit 58 of the roller 50 to the welder cooling system 36, specifically, one or more fluid conduits thereof. In the illustrated embodiment, the fittings 56 are elbow fittings. However other types of fittings are within the scope of the present disclosure.

Preferably, the roller 50 is made of (broadly, comprises at least one of) a non-magnetic material or a non-electrically conductive material so that the magnetic field generated by the induction coil 14 does not interact with or heat up the roller. The roller 50 includes a central segment 60 and opposite end segments 62. The end segments 62 extend outward from opposite ends of the central segment 60. The diameter of the end segments 62 decreases as the end segments 62 extend from the central segment 60 (e.g., the end segments are tapered). The central segment 60 has a constant diameter and extends between the two end segments 62. In operation, the central segment 60 contacts the two or more components C. The diameter of the roller 50 (e.g., central segment 60) is minimized in order to have the induction coil 14 positioned as close as possible to the components C being welded.

As mentioned above, the illustrated induction welder 10 is configured as an end effector for a robot (not shown). As such, the induction welder 10 includes at least one force adjuster 64 operatively connected to the press 16. Specifically, the at least one force adjuster 64 is operatively connected between the press 16 and the robot. The force adjuster 64 is configured to adjust a contact force applied by the press 16 against the two or more components C. The force adjuster adjusts the amount of force that is applied between the robot and the components C onto which the press 16 is placed. The force adjuster 40 may adjust (e.g., increase, decrease, maintain) the amount of contact force applied by the press 16 as the induction welder 10 is moved across the components C to ensure a relatively constant pressure (e.g., contact force) is applied. Maintaining a constant contact force over the components C results in a more consistent and uniform weld. In the illustrated embodiment, the induction welder 10 includes two force adjusters 64. Each force adjuster 64 is secured to the distal housing portion 12B, specifically the base plate 18A. Each force adjuster 64 may also be secured to the robot. In one embodiment, each force adjuster is a pneumatic cylinder although other types of force adjusters are within the scope of the present disclosure. In one embodiment, the robot the induction welder 10 is mounted on is a robotic arm, such as a six-axis robotic arm. However, other types of robots such as a selective-compliance-articulated robotic arm, a cylindrical robot, a delta robot, a polar coordinate robot, a vertically articulated robot, a Cartesian coordinate robot or any other suitable device are within the scope of the present disclosure.

In use, the induction welder 10 is positioned over the seam S of the two or more components C such that the press 16 engages the components. The magnetic field is applied to the weld site WS of the two or more components C to inductively weld the components together. To generate the magnetic field to weld the two or more components C together, an alternating electric current passes through the induction coil 14. This generates a magnetic field, as is generally known in the art. The magnetic field interacts with any electrically conductive or ferromagnetic material within its range, such as the two or more components C, which generates heat in the material. This heat melts the two or more components C and the components fuse together as they cool. In some applications, the two or more components C may not be electrically conducting or ferromagnetic, in which case a susceptor, as generally known in the art, may be used to produce heat, via its interaction with the magnetic field. The heat generated by the susceptor is used to melt and fuse the two or more components C together. Simultaneously with the application of the magnetic field, the press 16 presses or pushes the two or more components C together at the weld site WS. In particular, the rollers 50 of the press 16 press the components C together. By pushing the now melted material of the two or more components C together, the melted material mixes and intertwines with one another, fusing the two components C together as the components cool.

During operation, the induction coil 14 generates a large amount of heat, both in itself and in surrounding components (e.g., any components that interact with the magnetic field). Accordingly, simultaneously with the application of the magnetic field and pressing of the press 16, the welder cooling system 36 is operated to cool the induction welder 10. Specifically, the welder cooling system 36 cools the induction coil 14 and press 16 simultaneously with the application of magnetic field and pressing of the press. The welder cooling system 36 pumps the refrigerant through the induction coil 14 to cool the induction coil, and by extension of the magnetic flux controller 44 (which also heats up due to the magnetic field). Due to the shape of the induction coil 14 (e.g., square tubing), there is a large amount of surface contact between the refrigerant and the induction coil for cooling. In addition, the welder cooling system 36 pumps the refrigerant through the rollers 50 to cool the rollers and, by extension, the surfaces of the two or more components C. Because the rollers 50 are in contact with the two or more components C, the rollers will heat up even though they are generally transparent to (e.g., not affected by) the magnetic field. Cooling the rollers 50 with the welder cooling system 36 not only cools the rollers but also the surface of the components C they are in contact with. This may be usefully to prevent excessive deformation or deconsolidation of the two or more components due to the melting caused by the heat generated by the magnetic field In the illustrated embodiment, both the induction coil 14 and the press 16 are cooled using the same system 36, however it is understood separate cooling systems may be used.

Simultaneously with the application of the magnetic field and pressing of the press 16 (and operation of the welder cooling system 36), the component cooling system 46 is operated to cool the surfaces of the two or more components C. Specifically, the component cooling system 46 cools the surface of the components C simultaneously with the application of magnetic field and pressing of the press 16. The component cooling system 36 pumps the gas through the first and second nozzles 48A-B to cool the surfaces of the two or more components C. This may further prevent excessive deformation of the two or more components C, as mentioned above.

These processes (e.g., application of the magnetic field, pressing and cooling) continue as the induction welder 10 is moved in the weld direction D along the seam S to inductively weld the two or more components C together. As the induction welder 10 is moved, the weld site WS moves as well. The magnetic field from the induction coil 14 heats the two or more components C at the seam S simultaneously with the rollers 50 rolling over the seam, pushing the two or more components C together. As the induction welder 10 is moved along the seam S, gas from the third nozzle 48C flows over the seam, immediately behind the weld side WS (relative to the weld direction D) to cool the seam and solidify the weld.

In view of the above, it will be seen that several advantageous results are obtained.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions and methods without departing from the scope of the invention, it is intended that all matter contained in the above description and shown in the accompanying drawings shall be interpreted as illustrative and not in a limiting sense.

What is claimed is:

1. An induction welder for inductively welding two or more components together, the induction welder comprising:
    an induction coil configured to apply a magnetic field to a weld site of the two or more components to inductively weld the two or more components together, the induction coil including a proximal end and a distal end, the distal end configured to be positioned proximate the weld site of the two or more components to inductively weld the two or more components at the weld site;
    a press disposed distally of the induction coil such that the press is disposed between the induction coil and the two or more components when the two or more components are being inductively welded together, the press configured to press the two or more components together at the weld site simultaneously with the application of the magnetic field at the weld site, wherein the press includes at least one roller, an entirety of the at least one roller being distal of the distal end of the induction coil between the coil and the two or more components.

2. The induction welder of claim 1, wherein the at least one roller is configured to roll over the two or more components.

3. The induction welder of claim 2, wherein the at least one roller includes a plurality of rollers.

4. The induction welder of claim 3, wherein each roller comprises at least one of a non-magnetic material or a non-electrically conductive material.

5. The induction welder of claim 2, further comprising a welder cooling system configured to cool the at least one roller.

6. The induction welder of claim 5, wherein the welder cooling system is fluidly coupled to the at least one roller and is configured to bring a refrigerant into contact with the at least one roller to cool the at least one roller.

7. The induction welder of claim 6, wherein the at least one roller defines a refrigerant conduit, the welder cooling system configured to flow the refrigerant through the refrigerant conduit.

8. The induction welder of claim 7, wherein the induction coil includes a coil refrigerant conduit fluidly coupled to the welder cooling system, the welder cooling system configured to flow the refrigerant through the coil refrigerant conduit to cool the induction coil.

9. The induction welder of claim 1, further comprising a component cooling system configured to cool the two or more components.

10. The induction welder of claim 9, wherein the component cooling system is configured to direct air over the two or more components to cool the two or more components.

11. The induction welder of claim 10, wherein the component cooling system includes a first air nozzle configured to direct the air over the two or more components.

12. The induction welder of claim 11, wherein the component cooling system includes a second air nozzle configured to direct the air over the two or more components, the first and second air nozzles disposed on opposite sides of the induction coil.

13. The induction welder of claim 1, wherein the induction coil has a rectangular cross-sectional shape.

14. The induction welder of claim 13, wherein the induction coil comprises rectangular tubing.

15. The induction welder of claim 1, further comprising a magnetic flux controller surrounding a portion of the induction coil, the magnetic flux controller extending proximally from generally adjacent the distal end along the induction coil.

16. The induction welder of claim 1, wherein the induction coil includes an induction coil head, the induction coil head including a base coil segment defining the distal end of the induction coil, first and second coil segments extending generally proximally from opposite ends of the base coil segment and third and fourth coil segments extending generally proximally from the ends of the first and second coil segments, respectively, the third and fourth coil segments generally extending toward one another.

17. A method for inductively welding two or more components together, the method comprising:
    applying a magnetic field from a coil to a weld site of the two or more components to inductively
    weld the two or more components together;
    pressing, simultaneously with applying the magnetic field, the two or more components together at the weld site using at least one roller that is entirely spaced apart distally of a distal end of the coil such that an entirety of the roller is located between the distal end of the coil and the two or more components.

18. The method of claim 17, wherein the at least one roller of a press presses the two or more components together.

19. The method of claim 18, wherein the at least one roller is cooled simultaneously with the pressing of the two or more components together.

20. The method of claim 17, further comprising an induction welder, the induction welder applying the magnetic field and pressing the two or more components together.

21. The method of claim 20, further comprising moving the induction welder along a seam of the two or more components.

22. The method of claim 21, further comprising adjusting at least one of a speed of the induction welder or a strength of the magnetic field applied by the induction welder as the induction welder moves along the seam.

23. The method of claim 21, wherein adjusting at least one of the speed of the induction welder or strength of the magnetic field is based on information from a temperature sensor.

* * * * *